US009420219B2

(12) United States Patent
Jackson et al.

(10) Patent No.: US 9,420,219 B2
(45) Date of Patent: Aug. 16, 2016

(54) INTEGRATED SECURITY VIDEO AND ELECTROMAGNETIC PULSE DETECTOR

(75) Inventors: David Blake Jackson, Excelsior, MN (US); Frederick R. Faxvog, Long Lake, MN (US); Greg Fuchs, River Falls, WI (US); Brian Groh, Prior Lake, MN (US); Wallace Jensen, Centerville, MN (US); Gale Nordling, Excelsior, MN (US); James Nicholas Ruehl, Excelsior, MN (US)

(73) Assignee: Emprimus, LLC, St. Louis Park, MN (US)

( * ) Notice: Subject to any disclaimer, the term of this patent is extended or adjusted under 35 U.S.C. 154(b) by 759 days.

(21) Appl. No.: 13/332,168

(22) Filed: Dec. 20, 2011

(65) Prior Publication Data

US 2012/0243846 A1     Sep. 27, 2012

Related U.S. Application Data

(60) Provisional application No. 61/425,152, filed on Dec. 20, 2010.

(51) Int. Cl.
  *G06F 17/30*     (2006.01)
  *H04N 5/77*      (2006.01)
  *H04N 7/18*      (2006.01)

(52) U.S. Cl.
  CPC . *H04N 5/77* (2013.01); *H04N 7/181* (2013.01)

(58) Field of Classification Search
  CPC ......... H04N 7/142; H04N 7/144; H04N 7/18; G08B 13/196; G08B 13/19617; G08B 13/19663; G08B 13/19665
  USPC ................................... 348/143; 386/223, 226
  See application file for complete search history.

(56) References Cited

U.S. PATENT DOCUMENTS 3,009,984 A   11/1961   Lindgren
3,075,818 A   1/1963    Fay
(Continued)

FOREIGN PATENT DOCUMENTS

EP   0 668 692 A1   8/1995
EP   1 114 423 B1   2/2007
(Continued)

OTHER PUBLICATIONS

Toshio Sudo, "Electromagnetic Interference (EMI) of System-on-Package (SOP)", May 2, 2004, IEEE Transactions on Advanced Packaging, vol. 27, No. 2, p. 304-314.*
(Continued)

*Primary Examiner* — Sath V Perungavoor
*Assistant Examiner* — Clifford Hilaire
(74) *Attorney, Agent, or Firm* — Merchant & Gould P.C.

(57) ABSTRACT

The present invention relates systems and methods of electromagnetic protection for integrated video and electromagnetic detector security system equipment. A security system configured to be protected from electromagnetic events or attacks includes a quantity of video cameras and a quantity of electromagnetic event detectors disposed at a facility. The system also includes an electromagnetically-shielded cabinet containing computing equipment and a storage media. The electromagnetically-shielded cabinet is configured to receive data from each of the quantity of video cameras and electromagnetic detectors and store the data on the storage media, whereby, in the event of an electromagnetic event, information at the time of the event can be preserved on the storage media. Additionally, the electromagnetic detectors can trigger the video cameras to scan the surrounding area once an electromagnetic event has been detected such that images of suspicious vehicles, persons, packages or other items can be recorded for future forensic investigations.

15 Claims, 6 Drawing Sheets

(56) References Cited

U.S. PATENT DOCUMENTS

| | | | |
|---|---|---|---|
| 3,158,016 A | 11/1964 | Fay | |
| 3,189,394 A | 6/1965 | Fay | |
| 3,231,663 A | 1/1966 | Schwartz | |
| 3,297,383 A | 1/1967 | Fay | |
| 3,364,489 A | 1/1968 | Masters | |
| 3,390,491 A | 7/1968 | Hayden et al. | |
| 3,492,568 A | 1/1970 | Johnson | |
| 3,729,740 A | 4/1973 | Nakahara et al. | |
| 3,962,550 A | 6/1976 | Kaiserswerth | |
| D245,303 S | 8/1977 | Gazarek | |
| 4,060,709 A | 11/1977 | Hanson | |
| 4,066,305 A | 1/1978 | Gazarek | |
| D248,003 S | 5/1978 | Gazarek | |
| 4,102,554 A | 7/1978 | Reimer | |
| 4,115,656 A | 9/1978 | Aitel | |
| 4,177,353 A | 12/1979 | McCormack | |
| 4,532,513 A | 7/1985 | Halvorson | |
| 4,655,012 A | 4/1987 | Downey et al. | |
| 4,660,014 A | 4/1987 | Wenaas et al. | |
| 4,677,251 A | 6/1987 | Merewether | |
| 4,691,483 A | 9/1987 | Anderson | |
| 4,748,790 A | 6/1988 | Frangolacci | |
| 4,750,957 A | 6/1988 | Gustafson | |
| 4,755,630 A | 7/1988 | Smith et al. | |
| H000526 H * | 9/1988 | Miller | H05K 9/0045 174/388 |
| H0000526 H * | 9/1988 | Miller | 361/818 |
| 4,787,181 A | 11/1988 | Witten et al. | |
| D300,097 S | 3/1989 | Cook | |
| 4,884,171 A | 11/1989 | Maserang et al. | |
| 4,894,489 A | 1/1990 | Takahashi et al. | |
| 4,913,476 A | 4/1990 | Cook | |
| H0000821 H | 9/1990 | Hatfield et al. | |
| 4,962,358 A | 10/1990 | Svetanoff | |
| 5,045,636 A | 9/1991 | Johnasen et al. | |
| 5,079,388 A | 1/1992 | Balsells | |
| 5,117,066 A | 5/1992 | Balsells | |
| 5,136,119 A | 8/1992 | Leyland | |
| 5,136,453 A | 8/1992 | Oliver | |
| 5,148,111 A | 9/1992 | Shiloh et al. | |
| 5,179,489 A | 1/1993 | Oliver | |
| 5,184,311 A | 2/1993 | Kraus et al. | |
| 5,190,479 A | 3/1993 | Jordi | |
| 5,191,544 A | 3/1993 | Benck et al. | |
| 5,241,132 A | 8/1993 | McCormack | |
| 5,414,366 A | 5/1995 | Rogers | |
| 5,436,786 A | 7/1995 | Pelly et al. | |
| 5,465,534 A | 11/1995 | Mittag | |
| 5,546,096 A | 8/1996 | Wada | |
| 5,594,200 A | 1/1997 | Ramsey | |
| 5,600,290 A | 2/1997 | Anderson, II | |
| 5,685,358 A | 11/1997 | Kawasaki et al. | |
| 5,749,178 A | 5/1998 | Garmong | |
| 5,751,530 A | 5/1998 | Pelly et al. | |
| 5,828,220 A | 10/1998 | Carney et al. | |
| 5,929,821 A | 7/1999 | Goldstein et al. | |
| 5,939,982 A | 8/1999 | Gagnon et al. | |
| 5,983,578 A | 11/1999 | Huttie et al. | |
| 6,011,504 A | 1/2000 | Tan | |
| 6,068,009 A | 5/2000 | Paes et al. | |
| 6,090,728 A | 7/2000 | Yenni, Jr. et al. | |
| 6,157,546 A | 12/2000 | Petty et al. | |
| 6,185,065 B1 | 2/2001 | Hasegawa et al. | |
| 6,210,787 B1 | 4/2001 | Goto et al. | |
| 6,292,373 B1 | 9/2001 | Li et al. | |
| 6,320,123 B1 | 11/2001 | Reimers | |
| 6,324,075 B1 | 11/2001 | Unrein et al. | |
| 6,346,330 B1 | 2/2002 | Huang et al. | |
| 6,377,473 B1 | 4/2002 | Huang et al. | |
| 6,380,482 B1 | 4/2002 | Norte et al. | |
| 6,426,459 B1 | 7/2002 | Mitchell | |
| 6,442,046 B1 | 8/2002 | Sauer | |
| 6,480,163 B1 | 11/2002 | Knop et al. | |
| 6,485,595 B1 | 11/2002 | Yenni, Jr. et al. | |
| 6,542,380 B1 | 4/2003 | Hailey et al. | |
| 6,542,384 B1 | 4/2003 | Radu et al. | |
| 6,613,979 B1 | 9/2003 | Miller et al. | |
| 6,683,245 B1 | 1/2004 | Ogawa et al. | |
| 6,838,613 B2 | 1/2005 | Kopf | |
| 6,870,092 B2 * | 3/2005 | Lambert | H05K 9/0041 174/355 |
| 6,872,971 B2 | 3/2005 | Hutchinson et al. | |
| 6,885,846 B1 | 4/2005 | Panasik et al. | |
| 6,891,478 B2 | 5/2005 | Gardner | |
| 7,071,631 B2 | 7/2006 | Howard, II | |
| 7,210,557 B2 | 5/2007 | Phillips et al. | |
| 7,258,574 B2 | 8/2007 | Barringer et al. | |
| 7,369,416 B2 | 5/2008 | Plabst | |
| 7,400,510 B1 | 7/2008 | Milligan et al. | |
| 7,418,802 B2 | 9/2008 | Sarine et al. | |
| 7,420,742 B2 | 9/2008 | Wood et al. | |
| 7,475,624 B1 | 1/2009 | Daily | |
| 7,498,524 B2 | 3/2009 | Brench | |
| 7,504,590 B2 | 3/2009 | Ball | |
| 7,512,430 B2 | 3/2009 | Nakamura | |
| 7,515,219 B2 | 4/2009 | Bozzer et al. | |
| 7,560,135 B2 | 7/2009 | Kotsubo et al. | |
| 7,561,444 B2 | 7/2009 | He | |
| 7,576,289 B2 | 8/2009 | Kessel | |
| 7,589,943 B2 | 9/2009 | Ramirez et al. | |
| 7,710,708 B2 | 5/2010 | Park et al. | |
| 7,839,020 B2 | 11/2010 | Nakanishi | |
| 7,839,136 B1 | 11/2010 | John | |
| 8,085,554 B2 | 12/2011 | Holdgredge et al. | |
| 8,183,995 B2 | 5/2012 | Wang et al. | |
| 8,197,473 B2 | 6/2012 | Rossetto et al. | |
| 8,351,221 B2 | 1/2013 | Siomkos et al. | |
| 8,358,512 B2 | 1/2013 | Shiroishi et al. | |
| 8,358,515 B2 | 1/2013 | Chen et al. | |
| 8,373,998 B2 | 2/2013 | Ricci et al. | |
| 8,406,012 B2 | 3/2013 | Kim | |
| 8,493,504 B2 | 7/2013 | Kobayashi et al. | |
| 8,547,710 B2 | 10/2013 | Ruehl et al. | |
| 8,599,576 B2 | 12/2013 | Faxvog et al. | |
| 8,642,900 B2 | 2/2014 | Nordling et al. | |
| 8,643,772 B2 | 2/2014 | Anderson | |
| 8,754,980 B2 | 6/2014 | Anderson et al. | |
| 8,760,859 B2 | 6/2014 | Fuchs et al. | |
| 8,849,595 B2 * | 9/2014 | Manto | H05K 7/1497 702/57 |
| 2001/0046128 A1 | 11/2001 | Ogata | |
| 2002/0060639 A1 * | 5/2002 | Harman | G01S 13/56 342/28 |
| 2003/0024172 A1 * | 2/2003 | Lyons | E06B 5/16 52/79.1 |
| 2003/0029101 A1 | 2/2003 | Lyons | |
| 2003/0042990 A1 | 3/2003 | Schumacher | |
| 2003/0174487 A1 | 9/2003 | Garmong | |
| 2004/0112205 A1 | 6/2004 | MacDougall | |
| 2004/0232847 A1 | 11/2004 | Howard, II | |
| 2005/0174749 A1 | 8/2005 | Liiamaa et al. | |
| 2005/0247471 A1 | 11/2005 | Archambeault | |
| 2006/0170430 A1 | 8/2006 | Tarvainen et al. | |
| 2006/0272857 A1 | 12/2006 | Arnold | |
| 2006/0274517 A1 | 12/2006 | Coffy | |
| 2007/0002547 A1 | 1/2007 | Garmong | |
| 2007/0025095 A1 | 2/2007 | Beall et al. | |
| 2007/0093135 A1 | 4/2007 | Luo et al. | |
| 2007/0105445 A1 | 5/2007 | Manto et al. | |
| 2007/0126871 A1 | 6/2007 | Henninger, III et al. | |
| 2007/0127129 A1 | 6/2007 | Wood et al. | |
| 2007/0158914 A1 | 7/2007 | Tammaro et al. | |
| 2007/0296814 A1 * | 12/2007 | Cooper | G06T 7/2053 348/143 |
| 2008/0050172 A1 | 2/2008 | Simola et al. | |
| 2008/0080158 A1 | 4/2008 | Crocker et al. | |
| 2008/0250726 A1 | 10/2008 | Slagel et al. | |
| 2009/0067141 A1 | 3/2009 | Dabov et al. | |
| 2009/0125316 A1 | 5/2009 | Moore | |
| 2009/0140499 A1 | 6/2009 | Kline | |
| 2009/0229194 A1 | 9/2009 | Armillas | |
| 2009/0244876 A1 | 10/2009 | Li et al. | |
| 2009/0268420 A1 | 10/2009 | Long | |
| 2009/0278729 A1 | 11/2009 | Bosser et al. | |

(56) References Cited

U.S. PATENT DOCUMENTS

| | | |
|---|---|---|
| 2009/0291608 A1 | 11/2009 | Choi et al. |
| 2009/0295587 A1* | 12/2009 | Gorman, Jr. ............... 340/601 |
| 2010/0001916 A1 | 1/2010 | Yamaguchi et al. |
| 2010/0103628 A1 | 4/2010 | Steffler |
| 2010/0116542 A1 | 5/2010 | Sugihara et al. |
| 2010/0128455 A1 | 5/2010 | Ophoven et al. |
| 2010/0208433 A1 | 8/2010 | Heimann et al. |
| 2010/0315199 A1 | 12/2010 | Slagel et al. |
| 2010/0315792 A1 | 12/2010 | Jones |
| 2011/0058035 A1* | 3/2011 | DeBerry et al. ............ 348/143 |
| 2011/0088940 A1 | 4/2011 | Nordling et al. |
| 2011/0092181 A1* | 4/2011 | Jackson et al. ............. 455/341 |
| 2011/0169634 A1* | 7/2011 | Raj et al. .................... 340/540 |
| 2011/0222249 A1 | 9/2011 | Ruehl et al. |
| 2011/0267765 A1 | 11/2011 | Fuchs et al. |
| 2012/0140431 A1 | 6/2012 | Faxvog et al. |
| 2012/0326729 A1 | 12/2012 | Faxvog et al. |
| 2013/0152485 A1 | 6/2013 | Austin et al. |
| 2013/0170159 A1 | 7/2013 | Jiang |

FOREIGN PATENT DOCUMENTS

| | | |
|---|---|---|
| EP | 1860725 | 11/2007 |
| EP | 2 221 921 A1 | 8/2010 |
| GB | 294513 | 7/1928 |
| JP | 11-239288 | 8/1999 |
| JP | 2003-133849 | 5/2003 |

OTHER PUBLICATIONS

Sudo, Toshio, et al. "Electromagnetic interference (EMI) of system-on-package (SOP)." Advanced Packaging, IEEE Transactions on 27.2 (2004): 304-314.*
Military Handbook 235-1B, Electromagnetic (Radiated) Environment Considerations for Design and Procurement of Electrical and Electronic Equipment, Subsystems and Systems, Part 1B, General Guidance, 20 Pages, 1993.
Military Handbook 237B, Department of Defense Handbook, Guidance for Controlling Electromagnetic Environmental Effects on Platforms, Systems, and Equipment, 248 Pages, 1997.
Military Handbook 253, Guidance for the Design and Test of Systems Protected Against the Effects of Electromagnetic Energy, 27 Pages, 1978.
Military Handbook 273, Survivability Enhancement, Aircraft, Nuclear Weapon Threat, Design and Evaluation Guidelines, 228 Pages, 1983.
Military Handbook 411B, Power and the Environment for Sensitive DoD Electronic Equipment (General), vol. 1, 658 pages, 1990.
Military Handbook 419A, Grounding, Bonding, and Shielding for Electronic Equipments and Facilities, vol. 1 of 2 vol., Basic Theory, 812 Pages, 1987.
Military Handbook 1857, Grounding, Bonding and Shielding Design Practices, 185 Pages, 1998.
Military Handbook 5961A, List of Standard Semiconductor Devices, 33 pages, 1999.
Military Standard 188-124B, Grounding, Bonding and Shielding, for Common Long Haul/Tactical Communication Systems Including Ground Based Communications-Electronics Facilities and Equipments, 41 Pages, 1992.
Military Standard 188-125-1, Department of Defense Interface Standard, High-Altitude Electromagnetic Pulse (HEMP) Protection for Ground-Based C41 Facilities Performing Critical, Time-Urgent Missions (Part 1—Fixed Facilities), 107 Pages, 1998.
Military Standard 188-125-2, Department of Defense Interface Standard, High-Altitude Electromagnetic Pulse (HEMP) Protection for Ground-Based C41 Facilities Performing Critical, Time-Urgent Missions (Part 2—Transportable Systems), 148 Pages, 1999.
Military Standard 188-125, High-Altitude Electromagnetic Pulse (HEMP) Protection for Ground-Based C41 Facilities Performing Critical, Time-Urgent Missions (vol. 1—Fixed Facilities), 114 Pages, Feb. 1994.
Military Standard 220C, Department of Defense—Test Method Standard—Method of Insertion Loss Measurement, 19 Pages, 2009.
Military Standard 285—Notice of Cancellation—MIL-STD-285, dated 1956 canceled, 17 Pages, 1997.
Military Standard 285, Military Standard Attenuation Measurements for Enclosures, Electromagnetic Shielding, for Electronic Test Purposes, 15 Pages, 1956.
Military Standard 461C, Electromagnetic Emission and Susceptibility Requirements for the Control of Electromagnetic Interference, 183 Pages, 1986.
Military Standard 461E, Requirements for the Control of Electromagnetic Interference Characteristics of Subsystems and Equipment, 253 Pages, 1999.
Military Standard 461F, Requirements for the Control of Electromagnetic Interference Characteristics of Subsystems and Equipment, 269 Pages, 2007.
Military Standard 462, Electromagnetic Interference Characteristics, 80 Pages, 1967.
Military Standard 462D, Measurement of Electromagnetic Interference Characteristics, 203 Pages, 1993.
Military Standard 464, Electromagnetic Environmental Effects Requirements for Systems, 116 pages, 1997.
Military Standard 464A, Electromagnetic Environmental Effects Requirements for Systems, 121 pages, 2002.
Military Standard 469B, Radar Engineering Interface Requirements, Electromagnetic Compatibility, 98 Pages, 1996.
Military Standard 1542B (USAF), Electromagnetic Compatibility and Grounding Requirements for Space System Facilities, 52 Pages, 1991.
Military Handbook 1195, Radio Frequency Shielded Enclosures, 86 Pages, Sep. 1988.
IEEE Std 299-1997, IEEE Standard Method for Measuring the Effectiveness of Electromagnetic Shielding Enclosures, 44 pages, 1997.
Leland H. Hemming, Architectural Electromagnetic Shielding Handbook—A Design Specification Guide, IEEE Press, 232 Pages, 1991.
USAF Handbook for the Design and Construction of HEMP/TEMPEST Shielded Facilities, AF Regional Civil Engineer Central Region, Dallas, Texas, 39 Pages, 1986.
ETS-Lindgren—High Performance EMI/RFI Shielding Solutions, 2 Pages, 2002.
ETS-Lindgren—Double Electrically Isolated RF Enclosures, For Industrial, Communication, and Research and Development Applications, 8 Pages, 2005.
ETS-Lindgren—Tempest Information Processing System (TIPS), 2 Pages, 2008.
ETS-Lindgren—Table Top Enclosure—5240 Series, 2 Pages, 2009.
Ets-Lindgren—Auto Latching Door System, 2 Pages, (undated).
ETS-Lindgren—RF Shielded Doors, 5 Pages, (undated).
NSA-94-106, National Security Agency Specification for Shielded Enclosures, 9 Pages, 1994.
Holland Shielding Systems BV, Shielding Gaskets With or Without Water Seal (EMI-RFI-IP Gaskets), 2 Pages, (undated).
Holland Shielding Systems BV, EMI-RFI-EMP—Shielded Doors for Faraday Cages and EMI-RFI Shielded Room, 5 Pages, (undated).
Holland Shielding Systems BV, Innovative EMI Shielding Solutions—Gasket Selection, 36 Pages, (undated).
Equipto Electronic Corporation—Technical Guide to EMI/RFI Suppression in Electronic Cabinets, 16 Pages, Apr. 2005.
Crenlo-Emcor-Product-Options-Doors, 12 Pages, (undated).
RFI/EMI Shielded Cabinets and Features Available, 4 Pages, (undated).
Special Door Company, Radiation Shielding Doors: SH Door Tech, 2 Pages, (undated).
Special Door Company, EMP Doors: Electro Magnetic Pulse Doors, 3 Pages, (undated).
Braden Shielding Systems, Anechoic Chambers, EMC Chambers, MRI Enclosures, 1 Page, (undated).
Magnetic Shield Corp.—Bensenville, Illinois, Magnetic Shielding, 2 Pages, (undated).

(56) References Cited

OTHER PUBLICATIONS

EEP—Electromagnetic Radiation Shielding & Magnetic Field Shielding Technology—Products and Services, 3 Pages, (undated).
Fleming—RF & EMI Shielded Doors, Radiation Shielded Doors, 3 Pages, (undated).
H. Bloks, "NEMP/EMI Shielding," EMC Technology, vol. 5, No. 6, Nov.-Dec. 1986, 5 Pages.
W.E. Curran, "New Techniques in Shielding," Item, 1984, 9 Pages.
W. E. Curran, "Shielding for HEMP/TEMPEST Requirements," Item, 1988, 10 Pages.

\* cited by examiner

INTEGRATED SECURITY VIDEO AND ELECTROMAGNETIC PULSE DETECTOR

CROSS-REFERENCE TO RELATED APPLICATIONS

The present application claims priority from U.S. Provisional Application No. 61/425,152, filed Dec. 20, 2010, the disclosure of which is hereby incorporated by reference in its entirety.

TECHNICAL FIELD

The present disclosure relates to electromagnetic protection of security equipment. In particular, the present disclosure relates to electromagnetic protection for integrated video and electromagnetic detector security system equipment.

BACKGROUND

Exposure to electromagnetic fields can cause interference or damage to electrical equipment, causing that equipment to malfunction or rendering it nonoperational. For example, electrical equipment can be blown or otherwise fail in the event of a strong electromagnetic pulse or intentional electromagnetic interference event (EMP/IEMI).

EMP/IEMI events typically take one of two forms. First, high field events correspond to short-duration, high voltage events (e.g., up to and exceeding 100 kilovolts per meter), and typically are of the form of short pulses of narrow-band or distributed signals (e.g., in the frequency range of 14 kHz to 10 GHz). These types of events typically generate high voltage differences in equipment, leading to high induced currents and burnout of electrical components. Second, low field events (e.g., events in the range of 0.01 to 10 volts per meter) are indications of changing electromagnetic environments below the high field damaging environments, but still of interest in certain applications.

Existing systems are used to defeat a narrow range of threats. The protection schemes built into electronic systems are generally developed to address a certain possible issue, are not useful to address other electromagnetic interference issues. Although attempts have been made to "harden" or protect, certain military systems against these threats, many commercial electronic systems remain unprotected. However, these existing "hardening" solutions are cost-prohibitive to apply to a wide range of electronics, exposing critical assets to possible damage One such unaddressed concern is for example equipment that is designed for security systems at various facilities.

For these and other reasons, improvements are desirable.

SUMMARY

In accordance with the following disclosure, the above and other issues are addressed by the following:

In a first aspect, a security system configured to be protected from electromagnetic events includes a plurality of cameras and a plurality of electromagnetic event detectors disposed at a facility. The system also includes an electromagnetically-shielded cabinet containing computing equipment and a storage media. The electromagnetically-shielded cabinet is configured to receive data from each of the plurality of video cameras and electromagnetic detectors and store the data on the storage media, whereby, in the event of an electromagnetic event, video image information at the time of the event and for a period of time after the event can be preserved on the storage media. The capture of such video data can later be used for forensic investigations related to the IEMI or EMP attack.

In a second aspect, a security system for a facility configured to be protected from electromagnetic events includes a detection system configured to detect an electromagnetic event. The security system also includes a monitoring system coupled to the detection system; wherein upon detection of the electromagnetic event, the monitoring system is configured to scan an area around the facility, capture images, tag the images, and store the images in a storage media.

In another embodiment of the present invention, a method of securing a facility against an electromagnetic event includes: monitoring the facility with a plurality of cameras disposed at the facility, detecting an electromagnetic event with a plurality of electromagnetic detectors disposed at the facility, and storing data in the system in a storage media. If the plurality of cameras are electromagnetic shielded and electrically filtered, the method also includes: scanning a first area around the facility, capturing images of the area around the facility, tagging the images, storing the images in the storage media, and reviewing the images after the event. The method also includes reviewing the data and images after the electromagnetic event.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general the present disclosure relates to methods and systems for protection of security systems from various electromagnetic interference events, including Electromagnetic Pulse, Intentional Electromagnetic Interference (EMP/IEMI) threats, or any other electromagnetic event having an amplitude and frequency capable of damaging building electrical systems data centers and/or electronic equipment. In one embodiment, the present invention uses an EMP/IEMI protected camera, EMP/IEMI detectors, and an EMP/IMEI shielded and filtered cabinet for protecting video and detector data storage.

The logical operations of certain aspects of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Figure 1:
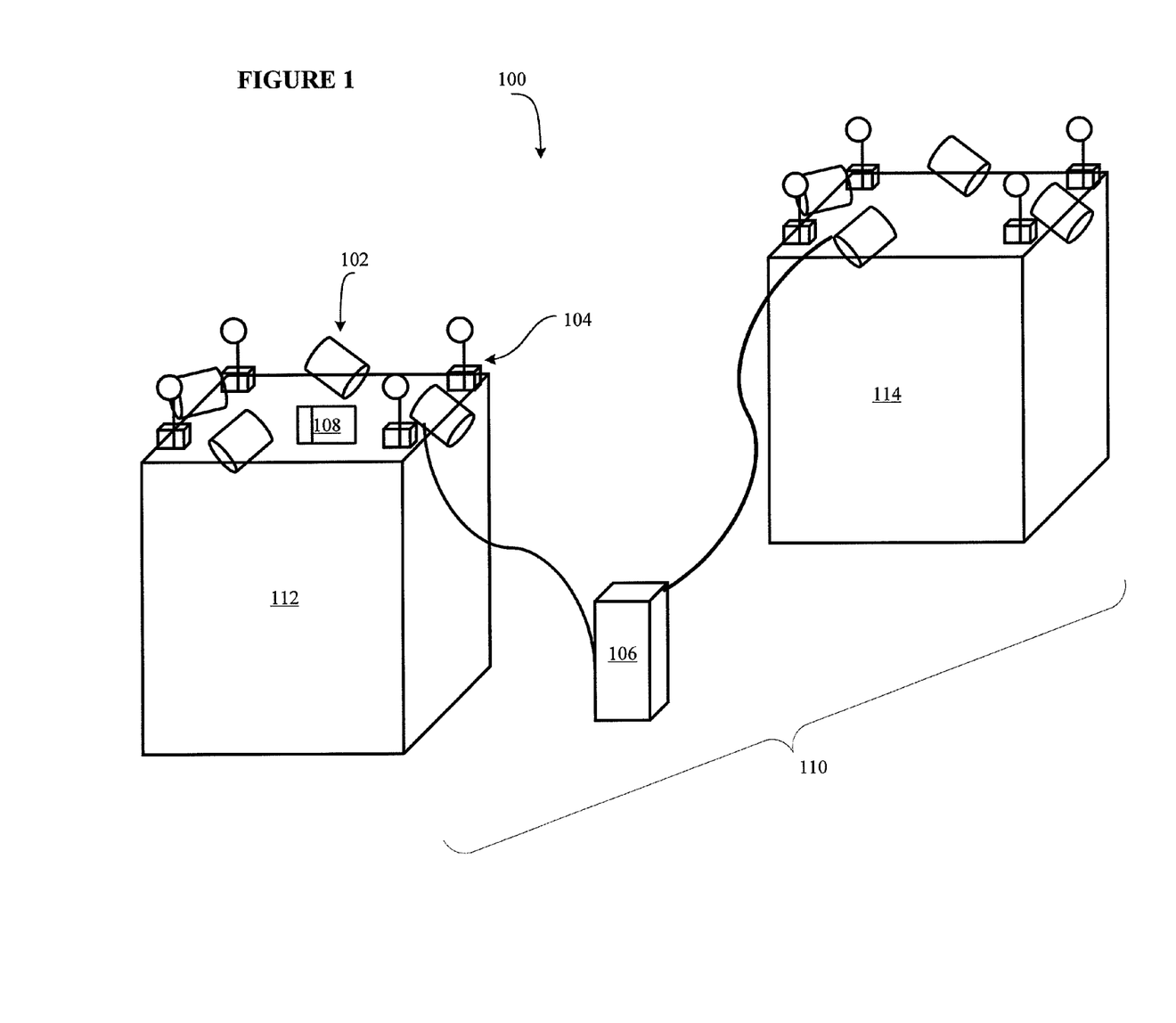
FIG. 1 is a schematic block diagram of an electromagnetically-protected security system installed at a facility, according to a possible embodiment of the present disclosure.

Referring now to FIG. 1, a schematic block diagram is shown of an electromagnetically-protected security system 100 installed at a facility 110, according to a possible embodiment of the present disclosure. The facility 110 in this embodiment includes buildings 112, 114. However, the facilities could be a production yard, a military operation or other type of facility.

In the embodiment shown, one or more video cameras 102 and electromagnetic detectors 104 are positioned around the facility 110 on the buildings 112, 114. In other embodiments, the facility 110 can include more or less than two buildings and/or structures and/or operations.

The one or more video cameras 102 and electromagnetic detectors 104 can be placed throughout the facility 110, including the exterior of the buildings 112, 114, as well as the interior of the buildings 112, 114. In certain embodiments, the video cameras 102 can be electromagnetically protected video cameras, such as are disclosed in copending U.S. Provisional Application No. 13/289,849, and entitled "Electromagnetically Shielded Video Camera and Shielded Enclosure for Image Capture Devices," the disclosure of which is hereby incorporated by reference in its entirety. In still further embodiments, the electromagnetic detectors 104 can be any of a number of types of detectors of electromagnetic events; example detectors useable in the system 100 are disclosed in U.S. patent application Ser. No. 12/906,902, filed Oct. 18, 2010, and entitled "Electromagnetic Field Detection Systems and Methods," the disclosure of which is hereby incorporated by reference in its entirety.

In use, video data captured by the video cameras 102 is streamed, for example via a protected electrical data cable or a fiber cable, to a storage media within an EMP/IEMI protected cabinet 106 containing computing equipment. Likewise, any signals received from the electromagnetic detectors 104 are streamed into this same EMP/IEMI protected cabinet 106. Should the facility 110 experience either an EMP or IEMI pulse, signals would be transmitted to the computing equipment and storage media, and optionally the incident would immediately give a warning signal to security officers at the facility 110. In certain embodiments, any video data stored in the media would also be tagged as to the time of the incident, either by the video cameras 102 or a computing system within the cabinet 106. Security personnel would then be able to review the video information to identify the source of the electromagnetic event, specifically including suspect vehicles, persons, packages, or other items that might be related to the cause of the incident.

In a second embodiment, one or more video cameras 102 can be a non-EMP/IEMI protected camera, which would record and transmit video up until an EMP/IEMI event. At the time of such an event, the camera would likely be damaged; however, any stored video up until the time of the event could be used as forensic evidence to determine the identity of a vehicle, person or packages that may have been involved in the EMP/IEMI attack. Other embodiments may include a combination of shielded and unshielded cameras wherein those cameras that are shielded would continue scanning upon detecting an electromagnetic event. In yet further embodiments, the cameras 102 can be still or infrared cameras.

The detectors 104 can take any of a number of forms. In some embodiments, the detectors 104 can be a standalone high field or low field electromagnetic event detector. In such embodiments, the detectors 104 can optionally also include other sensors, such as temperature, carbon monoxide, carbon dioxide, smoke, fire, radiation, or chemical sensors as well. Additionally, one or more different types of detectors can be used at a single facility 102.

In some embodiments, the detectors 104 are communicatively connected to a detection system 108, which in various embodiments can be a centrally-located, shielded computing system configured to receive signals from the detectors 104. The detection system 108 can analyze the signals received from the detectors and, based on one or more different types of calculations (as described below), can detect the presence of a high field or low field electromagnetic event, such as an EMP/IEMI event. The detection system 108 can also communicate status information regarding electromagnetic events, or observed electrical field readings, to a remote system (not shown) such as a data archival system or for purposes of alarming to a remote monitoring system, or for forensic information. The detection system 108 may be positioned at any location around the facility 110 that enables communication with the detectors 104, including within the cabinet 106, or on the exterior or interior of buildings 112, 114.

Figure 2A:
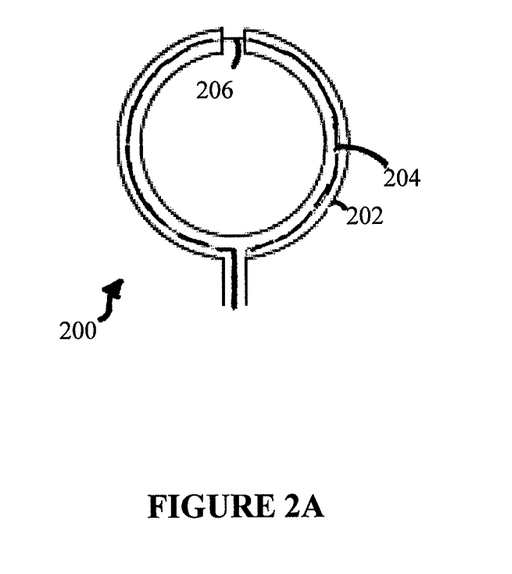
FIG. 2A is an example embodiment of an antenna useable to detect high field pulses for use in a detector in the electromagnetically-protected security system of FIG. 1.
Figure 2B:
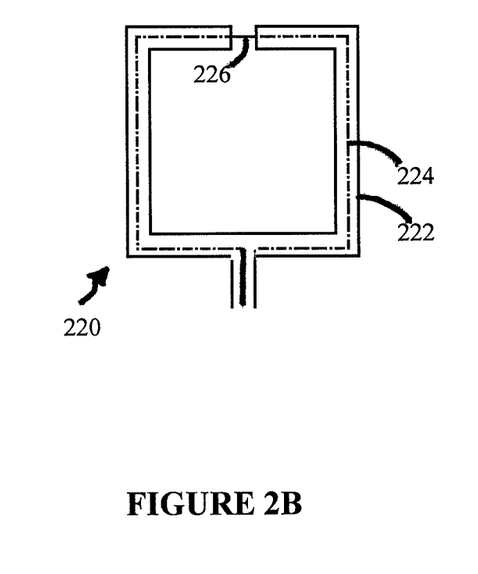
FIG. 2B is another example embodiment of an antenna useable to detect high field pulses for use in a detector in the electromagnetically-protected security system of FIG. 1.

Referring now to FIGS. 2A and 2B, two example antennas 200, 220 respectively, for use in the detectors 104 to detect high-field pulses, according to a possible embodiment of the present disclosure, are illustrated.

The antennas 200, 220 are, in the embodiments shown, a shielded loop magnetic antenna. For example, in FIG. 2A, the antenna 200 is a generally circular loop antenna having a loop of approximately ¼ inch or less in diameter, and including shielding (e.g., a metal sheath); in FIG. 2B, the antenna 220 is a generally rectangular loop antenna having size of approximately ¼ inch in length. Each antenna includes shielding 202, 222 (represented by solid lines) which extends around each loop 204, 224 (illustrated using dotted lines), and effectively limits induction of an electrical field on the antenna, while making the loops 204, 224 susceptible to magnetic fields. Each antenna also includes an exposed gap portion 206, 226, respectively, at which the magnetic field is induced. In particular embodiments, the antennas 200, 220 can be high field self-integrating B dot antennas. Other embodiments are possible as well.

In the embodiments shown, the antennas 200, 220 are configured to output voltages that are directly proportional to the electrical field amplitude that corresponds to the component of the observed magnetic field at a given frequency at the antenna. In certain embodiments, the antennas 200, 220 are configured to output voltages of zero to five volts, depending upon the field strength of the electrical field observed (as inferred from the observed magnetic field strength). Preferably, the antennas 200, 220 have tailored inductance and resistance values to result in output of such voltages and has a sufficiently fast (nanosecond range) response times to detect EMP/IEMI pulse events. In certain embodiments, the antennas 200, 220 have output amplitudes that in combination with an equalizer are independent of frequency, at least over a predetermined frequency range. In certain embodiments, that frequency range can include about 200 MHz to about 10 GHz;

in other embodiments, the frequency range can extend from about 10 MHz to about 10 GHz.

Additionally, although the antennas 200, 220 are described as being approximately ¼ inch in diameter, other sizes or dimensions of antennas are possible as well. By changing the size of the antennas 200, 220, different ranges of frequencies can be detected. The ¼ inch or less antennas described herein are intended to be responsive across the range of frequencies in which EMP/IEMI events occur, as described in the preceding paragraph.

In use, the antennas 200, 220 can each be used on the detectors 104 to obtain measurements of far field magnetic field measurements to infer electric field intensity, and therefore to detect electromagnetic pulses or other electromagnetic events in the security system 100, as previously described. When placed in a far field from the electromagnetic radiation source (e.g., spaced such that a radiation source is more than several wavelengths away from the antenna), the magnetic field strength detected by the antenna, $\overline{H}$, is directly correlated to the electric field strength component $\overline{E}$ by the impedance of free space, approximately 377Ω. Through use of the antennas 200, 220, electrical field strengths can be inferred for fields of very high intensity, including fields in the range of 100 volts per meter to 100,000 volts per meter or more without additional attenuation of the inbound signal.

Figure 3:
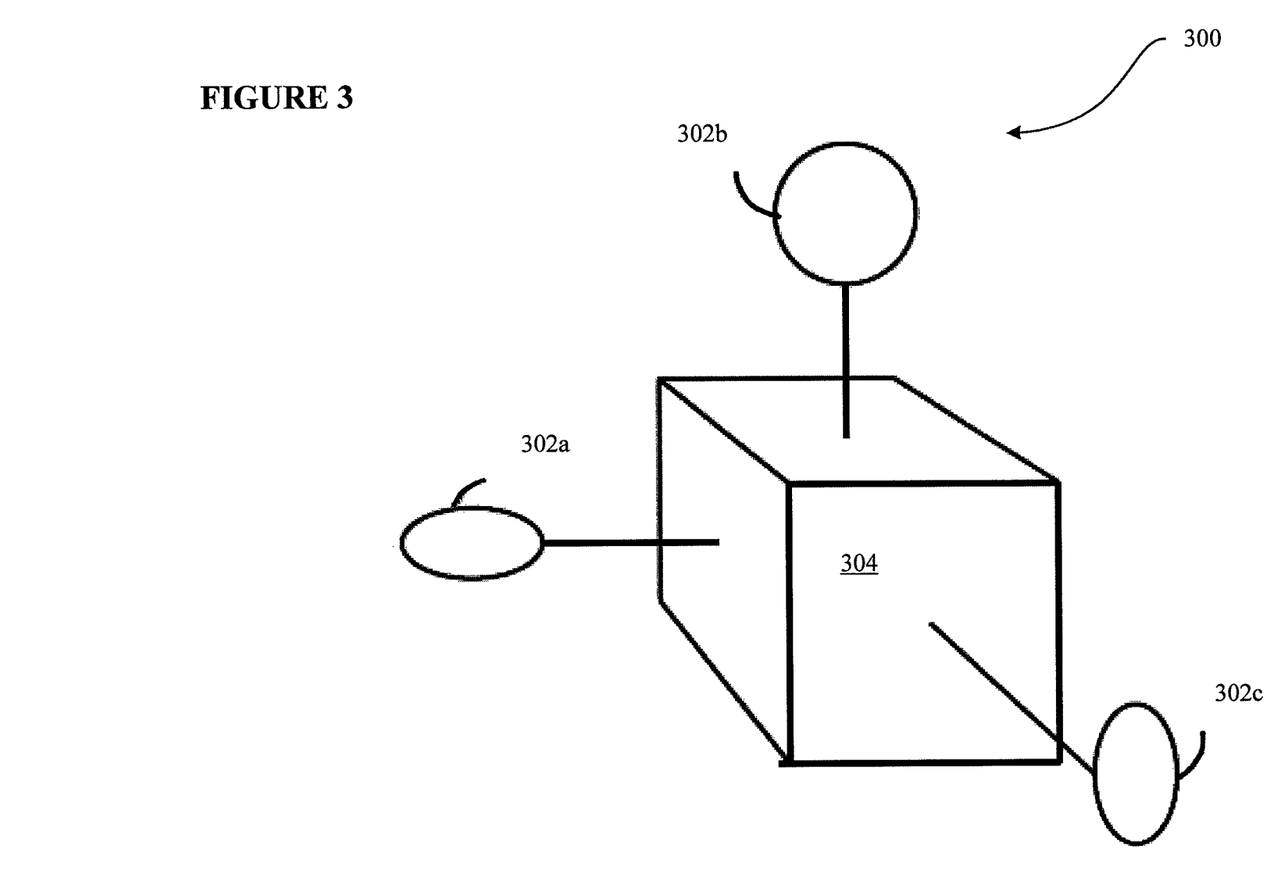
FIG. 3 is an example schematic depiction of an example embodiment of an antenna structure useable in connection with a detector in the electromagnetically-protected security system of FIG. 1.

Referring now to FIG. 3, an example of an antenna structure 300 useable as a detector 104 in the security system 100 is illustrated. In this embodiment, three shielded loop magnetic antennas 302a-c are used, and each extends along an axis in a direction normal to the other two antennas, and has a loop that is oriented in a direction normal to the orientation of the other two loop antennas. The antennas 302a-c are mounted in this embodiment to a cubic or rectangular base 304, which can also house either one or more standard modules or other circuits for processing signals received at the antennas, or forwarding those signals to such circuits for processing. In alternative embodiments, the antenna structure 300 may use varying numbers of shielded loop magnetic antennas, including one or more than three. The antenna structure 300, when used in the detectors 104, is capable of detecting an electromagnetic event. At such time, the detectors 104 transmits signals to the detection system 108 which analyzes the signals and may communicate the presence of an electromagnetic event to a remote location.

Figure 4:
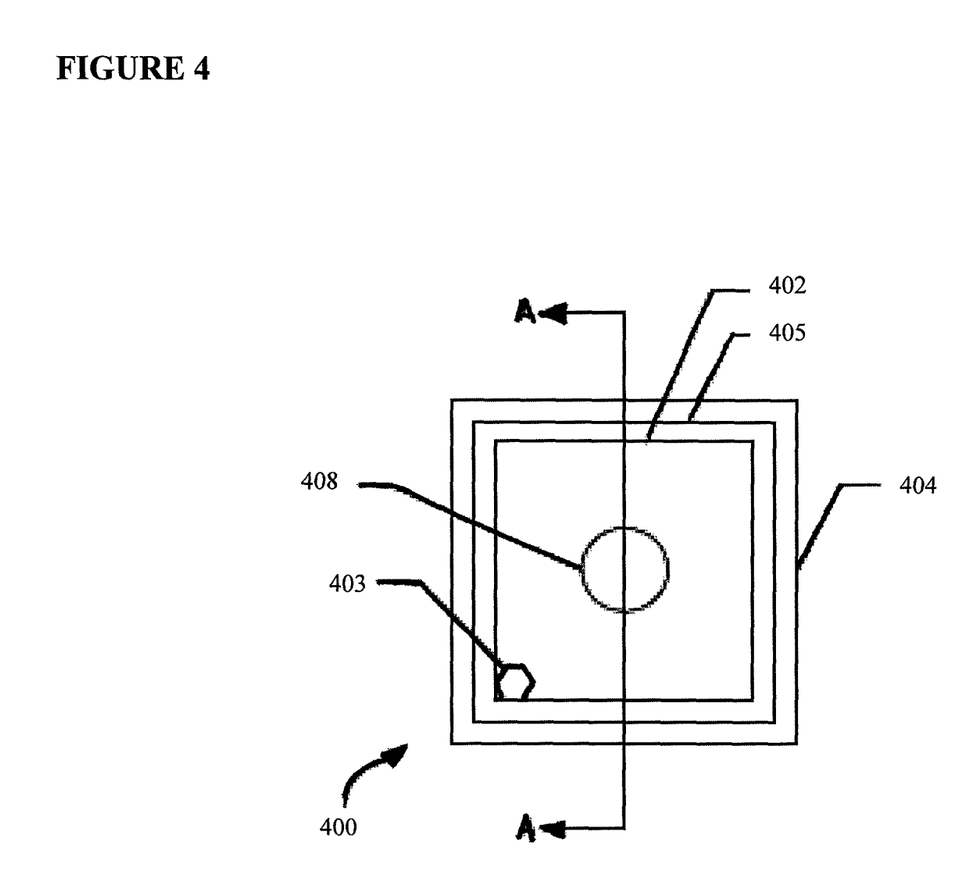
FIG. 4 is a front view of a schematic block diagram of an example embodiment of an electromagnetically shielded camera for use in the electromagnetically-protected security system of FIG. 1.
Figure 5:
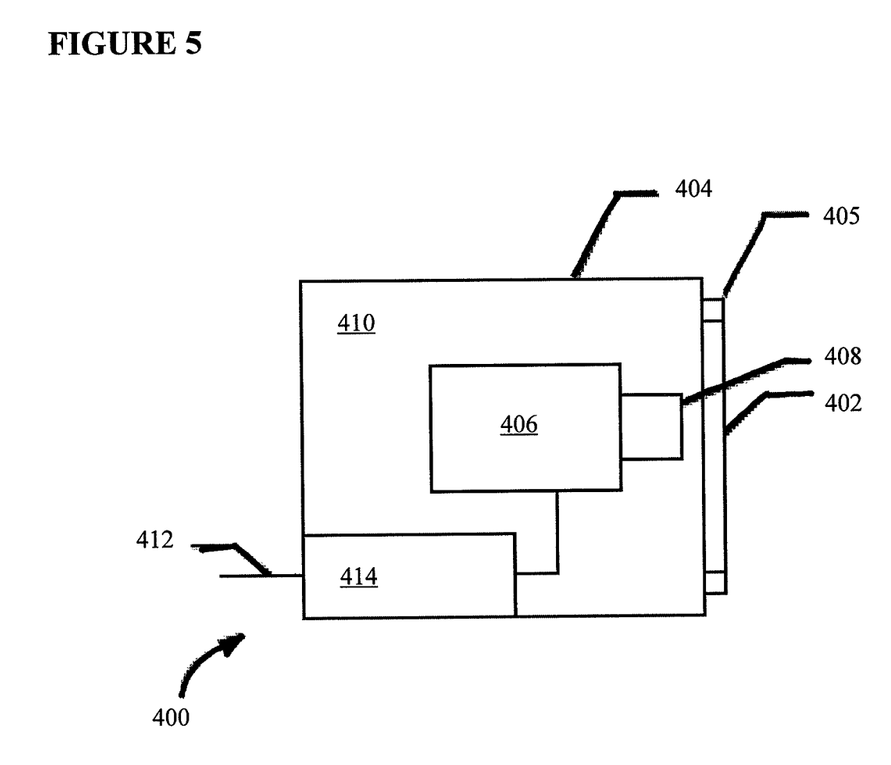
FIG. 5 is a side cross-sectional schematic block diagram view of the electromagnetically shielded camera of FIG. 4.

Referring now to FIGS. 4-5, an electromagnetically shielded camera 400, one embodiment of the cameras 102, is shown. FIG. 4 illustrates a front view of a schematic block diagram of the electromagnetically shielded camera 400, while FIG. 5 illustrates a side cross-sectional schematic view of the camera 400 along an axis "A" depicted in FIG. 4.

In the embodiment shown, the electromagnetically shielded camera 400 includes a waveguide beyond cutoff 402 mounted in a wall of an enclosure 404. Specifically, the arrangement 400 includes a waveguide 402, usually comprised of small, thin-walled conductive hexagonal or other shape cells 403, mounted in a wall of an enclosure 404 which encloses and shields a camera 406 and associated lens 408.

The enclosure 404 is generally configured to be an electromagnetically-shielding enclosure, capable of shielding an interior volume 410 of the enclosure from undesirable electromagnetic signals (e.g., electromagnetic signals exceeding a particular amplitude and frequency). In various embodiments, the enclosure 404 can be constructed from conductive materials, such as a metal (e.g., sheet metal or aluminum) having a thickness generally sufficient to attenuate electromagnetic signals to acceptable levels. Although in the embodiment shown the enclosure 404 is generally rectangular, it is understood that the enclosure 404 could be any of a variety of shapes. In an example embodiment, the enclosure 404 provides about 70 dB or more of attenuation. However, in alternative embodiments, other levels of attenuation could be provided as well.

In the embodiment shown, a frame 405 can be used to mount the waveguide beyond cutoff 402 to the enclosure 404. In various embodiments, the frame can provide a sealing connection to the enclosure 404, for example using an electromagnetically-shielded gasket arrangement or other arrangements.

In some embodiments, the camera 406 may include a shielded window or lens configured to prevent electromagnetic energy from entering the camera enclosure 404. Such a shielded window or lens may include a conductive coating suitable for rejecting electromagnetic radiation from damaging the various electrical components of the camera 406. Details regarding such an embodiment are disclosed in U.S. patent application Ser. No. 13/289,861, the disclosure of which is hereby incorporated by reference in its entirety. Additional details of a shielded camera, such as camera 406, are discussed in U.S. patent application Ser. No. 13/289,849, the disclosure of which was previously incorporated by reference.

As illustrated in further detail in FIG. 5, the camera 406 can be, in various embodiments, any of a variety of camera types, such as a still camera or video camera or infrared camera, and can be configured for use in the security system 100. In the embodiment shown, the camera 406 is powered by an external power signal line 412 which enters the enclosure 404 at an electrical filter 414. Various types of electrical filters could be used, such as a low-pass, band pass, or spark gap type filter; generally, the filter is selected to be capable of receiving a power signal (e.g., either a direct current signal having a predetermine voltage and amplitude, or an alternating current signal having an expected frequency and amplitude). The filter can be configured to prevent signals over a predetermined amplitude or frequency (e.g., within the range of typical EMP/IEMI events up to 10 GHz) from entering the enclosure via the power signal line 412.

The lens 408 can be any of a variety of types of automatically focusing or manually focused lenses. Generally, the lens 408 will have a focus length at a distance greater than the distance at which the waveguide beyond cutoff 402 is placed, such that the camera 406 does not focus on the waveguide, but instead focuses "through" the waveguide beyond cutoff on objects external to the enclosure 404. That is, the camera lens 408 can be selected, specific focal length and f-stop, such that the camera 406 focuses on objects in the far field. Hence the honeycomb waveguide material of the cells 403, which is in the near field, will be outside the depth of focus of the camera, and obscuration will be minimized. In this way, the imaging quality of the camera image will be retained with minimal distortion. In the embodiment shown, because the camera 406, lens 408 and waveguide 402 are mounted in alignment, viewing through the honeycomb waveguide cells 403 is nearly unobstructed.

In certain embodiments, an additional optical grade lens or window could optionally be located in "front" of the waveguide beyond cutoff 402 (external to the enclosure 404) to protect the camera and wave guide from exposure to environmental conditions.

Figure 6:
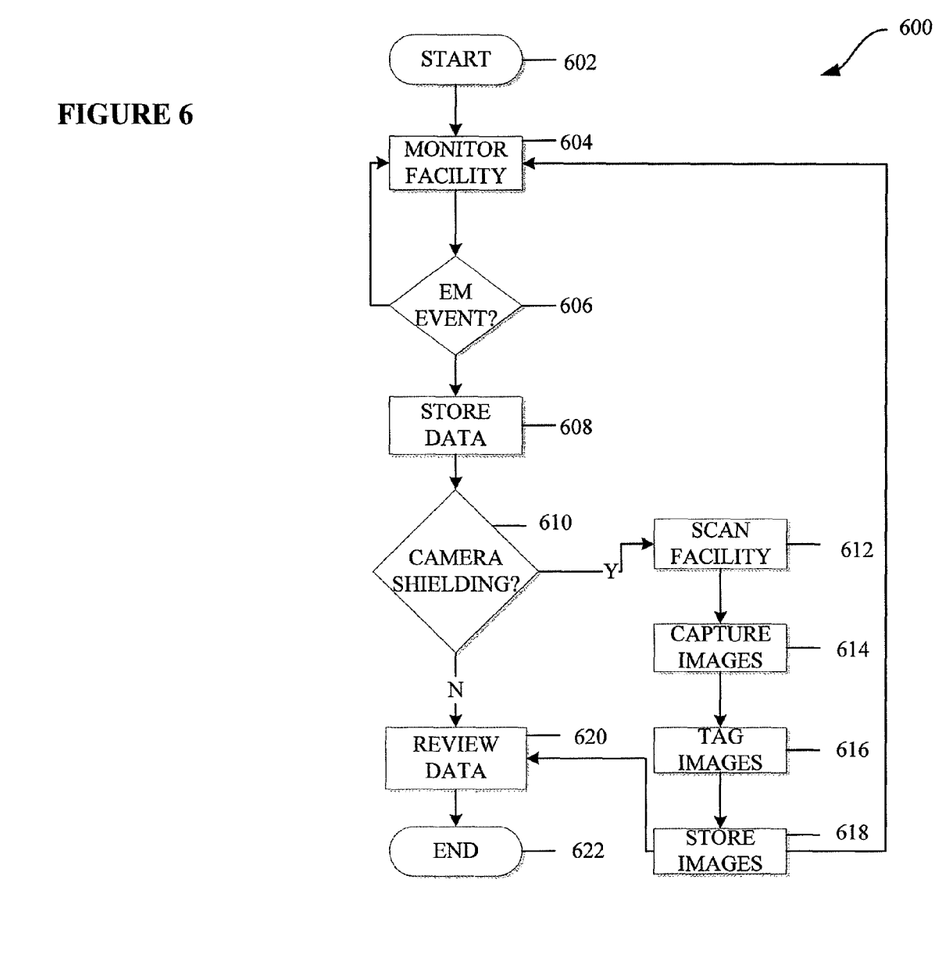
FIG. 6 is a flow chart illustrating a method of securing a facility against an electromagnetic event, according to one possible embodiment of the present disclosure.

FIG. 6 is a flowchart of a method 600 for capturing electromagnetic detector and camera data at a facility in the event of an electromagnetic attack. In some embodiments, the methods and systems can be performed at least in part using (1) electromagnetic detectors, (2) shielded or unshielded video cameras, (3) a shielded storage cabinet, and (4) a microprocessor or computing device communicatively connected to the detectors, cameras, and shielded cabinet.

In the embodiment shown, the method is initiated at a start operation 602, which corresponds to initial setup of one or more detectors, video cameras, and shielded cabinets at a facility or other location to be monitored, as well as connection of the one or more detectors to other computing devices configured to coordinate detection and analysis of high field and/or low field electromagnetic events, such as those described above.

A field monitoring operation 604 corresponds to scanning of the facility with the use of the cameras and detecting a field at an antenna of the electromagnetic (EM) detectors. The monitoring operation 604 can correspond to detection of one or more directional components of a magnetic field using one or more oriented shielded loop electromagnetic antennas, as described above in FIGS. 2A, 2B, and 3.

An electromagnetic event determination operation 606 determines whether an electromagnetic event has occurred. Typically the electromagnetic event determination operation 606 includes sampling a peak value detected using a standard circuit module and associated microprocessor, and performing one or more additional operations on that sample to determine whether a high or low field event occurs. For example, in the case of a high field event, the peak value may be summed or otherwise combined with other inferred electrical field values (e.g., by using the square root of a sum of squares) to arrive at an overall electromagnetic field value, and comparing that value to a preset known threshold, over which it is assumed that a high field event has occurred. In a further example, for low field events, the detected peak value can be directly compared to a known threshold value, and based on that comparison the existence of a low field event can be determined.

If no high or low field event is detected, operational flow can return to the field monitoring operation 604 to continue monitoring the electromagnetic fields present at the detector and scanning the facility with the cameras. However, if a high or low field event is detected, operational flow proceeds to a data storing operation 608, which stores any data (including field values and times at which the filed values were captured) obtained during the field monitoring operation 604. In some embodiments, the existing data will be transmitted to a shielded storage cabinet having a storage media in which the data can be stored and secured for later viewing. In some embodiments, the data storing operation 608 will also simultaneously include communicating the event to a remote location to report the incident. In other embodiments, communication of the event may occur at a later time.

A shielded-camera determination operation 610 determines whether the cameras used in the security system include an electromagnetic shielding. If it is determined that they do, a scanning operation 612 begins. Typically, the scanning operation 612 includes scanning the facility through the use of the cameras for unusual activity on or around the facility. A capture image operation 614 collects image data of the facility. The type of image captured can vary based on the type of cameras used. For example, in some embodiments, the images may be still, video, or infrared images. After the images are captured, a tagging image operation 616 tags the data with relevant information, such as, for example, field values and times at which the filed values were captured. In other embodiments, various other tags may exist. A storing image operation 618 stores the newly captured images for later review. In some embodiments, the images will be stored in a storage media located within the shielded cabinet so that the images will be protected from destruction by the electromagnetic event.

Whether the shielded camera determination operation 610 determines that the cameras are shielded or not, the operational flow eventually can continue to a reviewing data operation 620. The reviewing data operation 620 includes reviewing the stored data after the electromagnetic event. Specifically, the data can be reviewed to identify the source of the electromagnetic event, including suspect vehicles, persons, packages, or other items that might be related to the cause of the incident. In some embodiments, this step is implemented by security personnel. An end operation 622 corresponds to completed detection after a desired (e.g. preset or undetermined) amount of time after the electromagnetic event.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A security system configured to be protected from electromagnetic events, the system comprising:
   a plurality of cameras disposed at a facility;
   a plurality of electromagnetic detectors disposed at the facility, at least one of the electromagnetic detectors configured to detect an electromagnetic event exceeding 100 kilovolts per meter; and
   an electromagnetically-shielded cabinet containing computing equipment and a storage media, the electromagnetically-shielded cabinet configured to receive data from each of the plurality of video cameras and electromagnetic detectors, wherein the data may be received during an electromagnetic event, and store the data on the storage media, whereby, in the event of an electromagnetic event, information at the time of the electromagnetic event can be preserved on the storage media;
   wherein at least one of the plurality of electromagnetic detectors comprises:
      a shielded loop magnetic antenna configured to receive signals representing at least a portion of a far field magnetic field generated from an electromagnetic pulse (EMP) or intentional electromagnetic interference (IEMI) event, the EMP or IEMI event having an electric field amplitude between 10volts/meter and 100,000 volts/meter and a frequency between 1 MHz to 10 GHz; and
      a circuit electrically connected to the shielded loop magnetic antenna, the circuit including:
         an equalizer connected to the shielded loop magnetic antenna via a direct current isolation circuit, the equalizer outputting signals having amplitudes independent of frequencies of detected signals, the equalizer compensating for a varying frequency response of the antenna;
         a logarithmic amplifier electrically connected to the equalizer and configured to generate a range of signals based on signals received at the antenna; and
         a peak detector receiving signals from the logarithmic amplifier and configured to capture a peak value of the signals; and wherein the peak detector determines a peak value of an electrical field of the EMP or IEMI event based on the captured signals.

2. The security system of claim 1, wherein the plurality of cameras comprises at least one electromagnetically protected camera arrangement comprising:
   a video, infrared or still camera including a viewfinder having a lens;
   an electromagnetically shielded enclosure defining an interior volume containing the camera and configured to include at least one opening aligned with the lens; and
   a waveguide beyond cutoff disposed across the at least one opening, the waveguide beyond cutoff including a plurality of cells sized and oriented to shield the interior volume of the enclosure from electromagnetic signals while exposing an optical path between the lens and objects external to the enclosure.

3. The security system of claim 1, wherein the plurality of cameras comprises at least one electromagnetically protected camera arrangement comprising:
   a video, infrared or still camera including a viewfinder having a lens;
   an electromagnetically shielded enclosure defining an interior volume containing the camera and configured to include at least one opening aligned with the lens; or
   a window or lens with an electrically conductive coating which attenuates electromagnetic radiation to prevent electromagnetic energy from damaging camera electronics.

4. The security system of claim 1, wherein the plurality of cameras comprises a plurality of video cameras.

5. The security system of claim 1, wherein information for a preset time after the electromagnetic event can be preserved on the storage media.

6. The security system of claim 1, wherein a detection system is communicatively connected to each of the plurality of electromagnetic detectors, the detection system including one or more computing systems configured to receive information from the plurality of electromagnetic detectors regarding observed electromagnetic fields and further configured to detect the presence of an electromagnetic event exceeding 100 kilovolts per meter at one or more of the detectors.

7. A security system for a facility configured to be protected from electromagnetic events, the security system comprising:
   a detection system configured to detect, using one or more electromagnetic detectors, an electromagnetic event exceeding 100 kilovolts per meter;
   wherein at least one of the one or more plurality of electromagnetic detectors comprises:
      a shielded loop magnetic antenna configured to receive signals representing at least a portion of a far field magnetic field generated from an electromagnetic pulse (EMP) or intentional electromagnetic interference (IEMI) event, the EMP or IEMI event having an electric field amplitude between 10 volts/meter and 100,000 volts/meter and a frequency between 1 MHz to 10 GHz; and
      a circuit electrically connected to the shielded loop magnetic antenna, the circuit including:
         an equalizer connected to the shielded loop magnetic antenna via a direct current isolation circuit, the equalizer outputting signals having amplitudes independent of frequencies of detected signals, the equalizer compensating for a varying frequency response of the antenna;
         a logarithmic amplifier electrically connected to the equalizer and configured to generate a range of signals based on signals received at the antenna; and
         a peak detector receiving signals from the logarithmic amplifier and configured to capture a peak value of the signals; and wherein the peak detector determines a peak value of an electrical field of the EMP or IEMI event based on the captured signals; and
   a monitoring system coupled to the detection system; wherein upon detection of an electromagnetic event, the monitoring system is configured to scan an area around the facility, capture images, tag the images, and store the images in a storage media.

8. The security system of claim 7, wherein the storage media is positioned in an electromagnetically-shielded cabinet.

9. The security system of claim 7, wherein the images are one of video, infrared or still images.

10. The security system of claim 7, wherein upon detection of the electromagnetic event, the system transmits a warning signal to a remote location.

11. The security system of claim 7, wherein the detection system comprises a plurality of electromagnetic detectors.

12. The security system of claim 7, wherein the monitoring system comprises a plurality of cameras.

13. A method of securing a facility against an electromagnetic event, the method comprising:
   monitoring the facility with a plurality of cameras disposed at the facility;
   detecting an electromagnetic event with a plurality of electromagnetic detectors disposed at the facility, at least one of the electromagnetic detectors comprising:
      a shielded loop magnetic antenna configured to receive signals representing at least a portion of a far field magnetic field generated from an electromagnetic pulse (EMP) or intentional electromagnetic interference (IEMI) event, the EMP or IEMI event having an electric field amplitude between 10 volts/meter and 100,000 volts/meter and a frequency between 1 MHz to 10 GHz; and
      a circuit electrically connected to the shielded loop magnetic antenna, the circuit including:
         an equalizer connected to the shielded loop magnetic antenna via a direct current isolation circuit, the equalizer outputting signals having amplitudes independent of frequencies of detected signals, the equalizer compensating for a varying frequency response of the antenna;
         a logarithmic amplifier electrically connected to the equalizer and configured to generate a range of signals based on signals received at the antenna; and
         a peak detector receiving signals from the logarithmic amplifier and configured to capture a peak value of the signals; and wherein the peak detector determines a peak value of an electrical field of the EMP or IEMI event based on the captured signals;
   storing data in the system in a storage media;
   if the plurality of cameras comprise an electromagnetic shielding, capturing, before and during an electromagnetic event, images of the area around the facility; tagging the images; and storing the images in the storage media; and reviewing the data and images after the electromagnetic event.

14. The method of claim 13, further comprising transmitting an alert signal indicating the presence of the electromagnetic event.

15. The method of claim 14, further comprising:
communicating the presence of the electromagnetic event to at least one of the plurality of facilities.

* * * * *